United States Patent
Zhao et al.

(10) Patent No.: US 12,151,596 B2
(45) Date of Patent: Nov. 26, 2024

(54) REMOVABLE SEAT USED WITH A LONG RAIL ASSEMBLY

(71) Applicant: Magna Seating Inc., Aurora (CA)

(72) Inventors: Kai Zhao, Rochester Hills, MI (US); Michael D Nacy, Lake Orion, MI (US); Detjon Marini, White Lake, MI (US); Louis Vetere, II, Commerce Township, MI (US); Cheikh Dioum, Farmington Hills, MI (US)

(73) Assignee: Magna Seating Inc., Aurora (CA)

( * ) Notice: Subject to any disclaimer, the term of this patent is extended or adjusted under 35 U.S.C. 154(b) by 571 days.

(21) Appl. No.: 17/295,110

(22) PCT Filed: Nov. 19, 2019

(86) PCT No.: PCT/US2019/062212
§ 371 (c)(1),
(2) Date: May 19, 2021

(87) PCT Pub. No.: WO2020/082094
PCT Pub. Date: Apr. 23, 2020

(65) Prior Publication Data
US 2022/0017000 A1      Jan. 20, 2022

Related U.S. Application Data

(60) Provisional application No. 62/769,029, filed on Nov. 19, 2018.

(51) Int. Cl.
*B60N 2/07* (2006.01)
*B60N 2/06* (2006.01)
*B60N 2/02* (2006.01)

(52) U.S. Cl.
CPC .............. *B60N 2/0715* (2013.01); *B60N 2/06* (2013.01); *B60N 2/0732* (2013.01); *B60N 2/02253* (2023.08)

(58) Field of Classification Search
CPC ................ B60N 2/0717; B60N 2/0732; B60N 2/02253; B60N 2/0722; B60N 2/0812;
(Continued)

(56) References Cited

U.S. PATENT DOCUMENTS 4,721,337 A * 1/1988 Tomita ............... B60N 2/02246
297/344.1
5,094,420 A * 3/1992 Aihara ............... B60N 2/02246
248/419
(Continued)

FOREIGN PATENT DOCUMENTS

CN       115556644 A  *  1/2023
DE       202006005525     7/2006
(Continued)

*Primary Examiner* — Amy R Weisberg
*Assistant Examiner* — Wenwei Zhuo
(74) *Attorney, Agent, or Firm* — Miller Canfield

(57) ABSTRACT

A long rail assembly for use in an automotive vehicle has a long rail, a power rail drive assembly, and a latch assembly. The latch assembly removably couples the vehicle seat to the power rail drive assembly. When the latch assembly is latched, the seat is capable of power sliding adjustment and can be moved along a channel axis to a desired position within the interior of the vehicle. When the latch assembly is unlatched, the entire seat can be removed from the vehicle to provide for added space and variability in the vehicle interior configuration.

23 Claims, 9 Drawing Sheets

(58) Field of Classification Search
CPC .... B60N 2/0818; B60N 2/067; B60N 2/0875; B60N 2/06; B60N 2/01516; B60N 2/01508; B60N 2/0155; B60N 2/01558; B60N 2/01583; B60N 2/929
USPC ........ 297/344.11; 248/429; 296/65.13, 65.03
See application file for complete search history.

(56) References Cited

U.S. PATENT DOCUMENTS

| | | | |
|---|---|---|---|
| 5,323,998 | A | 6/1994 | Aihara |
| 6,691,971 | B2 | 2/2004 | Yamada et al. |
| 7,331,558 | B2* | 2/2008 | Jeong ................. B60N 2/01583 |
| | | | 248/419 |
| 8,844,891 | B2 | 9/2014 | Yamada et al. |
| 10,011,195 | B2 | 7/2018 | Kume et al. |
| 11,332,046 | B2* | 5/2022 | Aktas .................. B60N 2/3047 |
| 2011/0095160 | A1* | 4/2011 | Kimura .................. B60N 2/067 |
| | | | 248/429 |
| 2012/0145867 | A1 | 6/2012 | Benthien |
| 2015/0069807 | A1* | 3/2015 | Kienke ................ B60N 2/0712 |
| | | | 297/344.1 |
| 2018/0086230 | A1* | 3/2018 | Kume .................. B60N 2/0707 |
| 2018/0334054 | A1* | 11/2018 | Higuchi ............. B60N 2/02246 |
| 2019/0168636 | A1* | 6/2019 | Higuchi ............... B60N 2/0727 |
| 2019/0168641 | A1* | 6/2019 | Higuchi ............. B60N 2/02246 |
| 2019/0359087 | A1* | 11/2019 | Galan Garcia ........ B60N 2/686 |
| 2020/0262317 | A1* | 8/2020 | Napau .................... B60N 2/067 |
| 2020/0369178 | A1* | 11/2020 | Maloney ................. B60N 2/01 |
| 2021/0394647 | A1* | 12/2021 | Shim ...................... B60N 2/067 |

FOREIGN PATENT DOCUMENTS

| | | | | |
|---|---|---|---|---|
| DE | 102020201929 | A1 * | 8/2020 | .......... B60N 2/0232 |
| DE | 102022203224 | A1 * | 4/2023 | |
| KR | 101034307 | | 5/2011 | |

* cited by examiner

REMOVABLE SEAT USED WITH A LONG RAIL ASSEMBLY

CROSS-REFERENCE TO RELATED APPLICATIONS

This application claims priority to and all the benefits of U.S. Provisional Application 62/769,029, filed Nov. 19, 2018, and entitled "Removable Seat Used with a Long Rail Assembly Having Power Adjustment", the disclosure of which is hereby incorporated by reference in its entirety.

BACKGROUND OF THE INVENTION

1. Field of the Invention

The present invention relates to a long rail assembly wherein a seat with power adjustment capability is removably attached to a long rail assembly.

2. Description of Related Art

Multi-purpose, semi-autonomous, and fully autonomous vehicles are being introduced into the market. It is desirable to have a vehicle with an interior space that can be changed or reconfigured for various functions. For example, a consumer may want to remove a second and/or third row of seats to allow for more cargo space. In the future, with fully autonomous vehicles, a consumer may want to remove all of the seats creating a large, open, and multi-functional interior space. Thus, it is desirable to have a system with power adjustment capabilities that still allows the vehicles seats to be removed and added as needed.

SUMMARY OF THE INVENTION

The present invention relates to a long rail assembly for providing sliding movement of a seat within a vehicle. A fixed long rail extends longitudinally between opposing first and second ends and defines an interior cavity therebetween. A rail drive assembly extends longitudinally between opposing first and second ends and slidably coupled to the fixed long rail for providing the sliding movement of the seat along the fixed long rail. A drive wheel is rotatably coupled within the interior cavity of the fixed long rail. A gearbox is adapted to be attached to the vehicle seat and operatively coupled to the drive wheel for automatically driving the rail drive assembly longitudinally along the fixed long rail. A coupling interface is between the gearbox and the driving wheel for removably coupling the gearbox to the drive wheel and provide power sliding movement of the rail drive assembly along the fixed long rail while also allowing removable coupling of the seat to the rail drive assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-6 illustrate a long rail assembly having a power rail drive assembly configured to provide sliding adjustment of a seat in an automotive vehicle according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
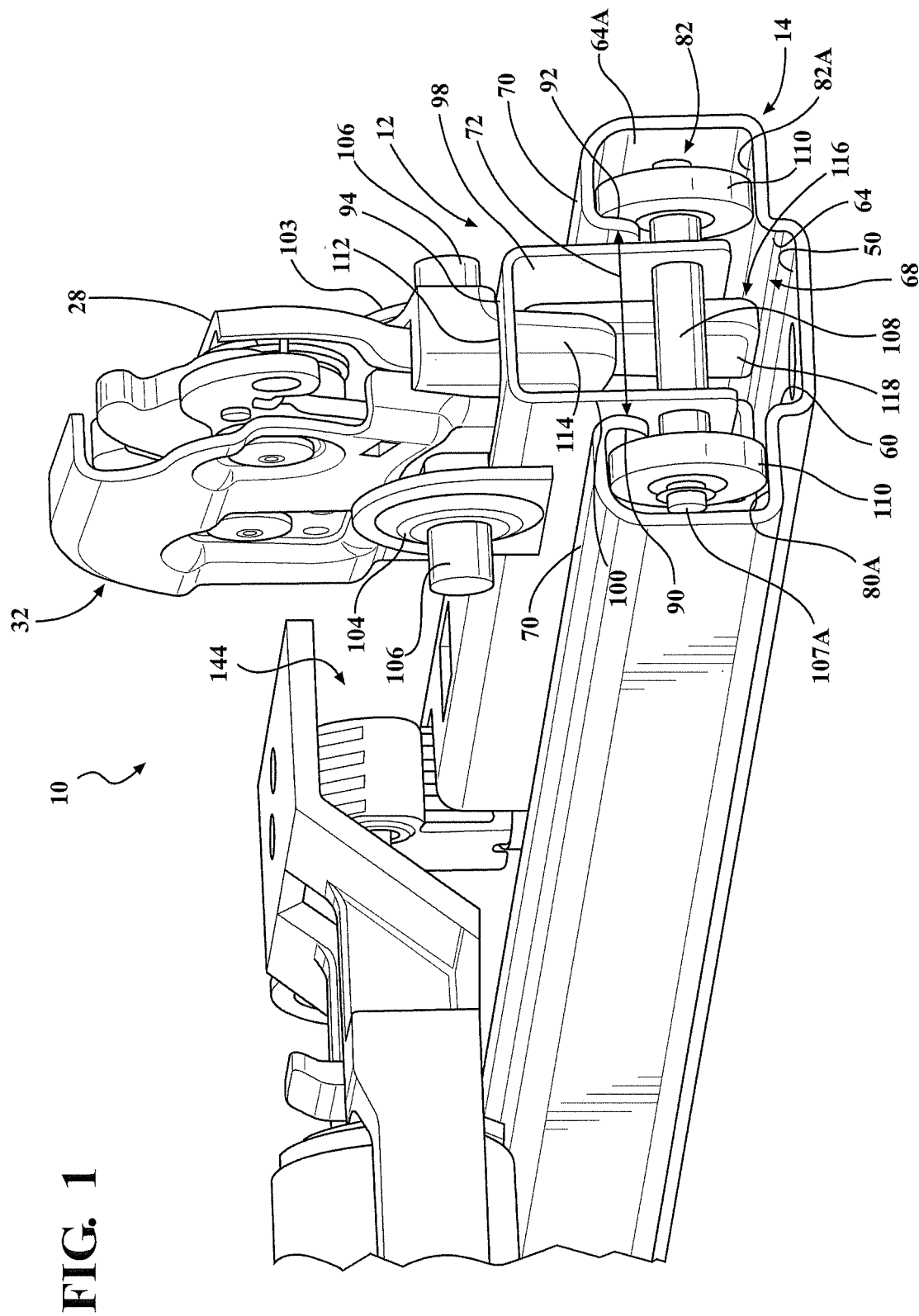
FIG. 1 is a fragmentary perspective view of a long rail assembly according to one embodiment of the invention.
Figure 2:
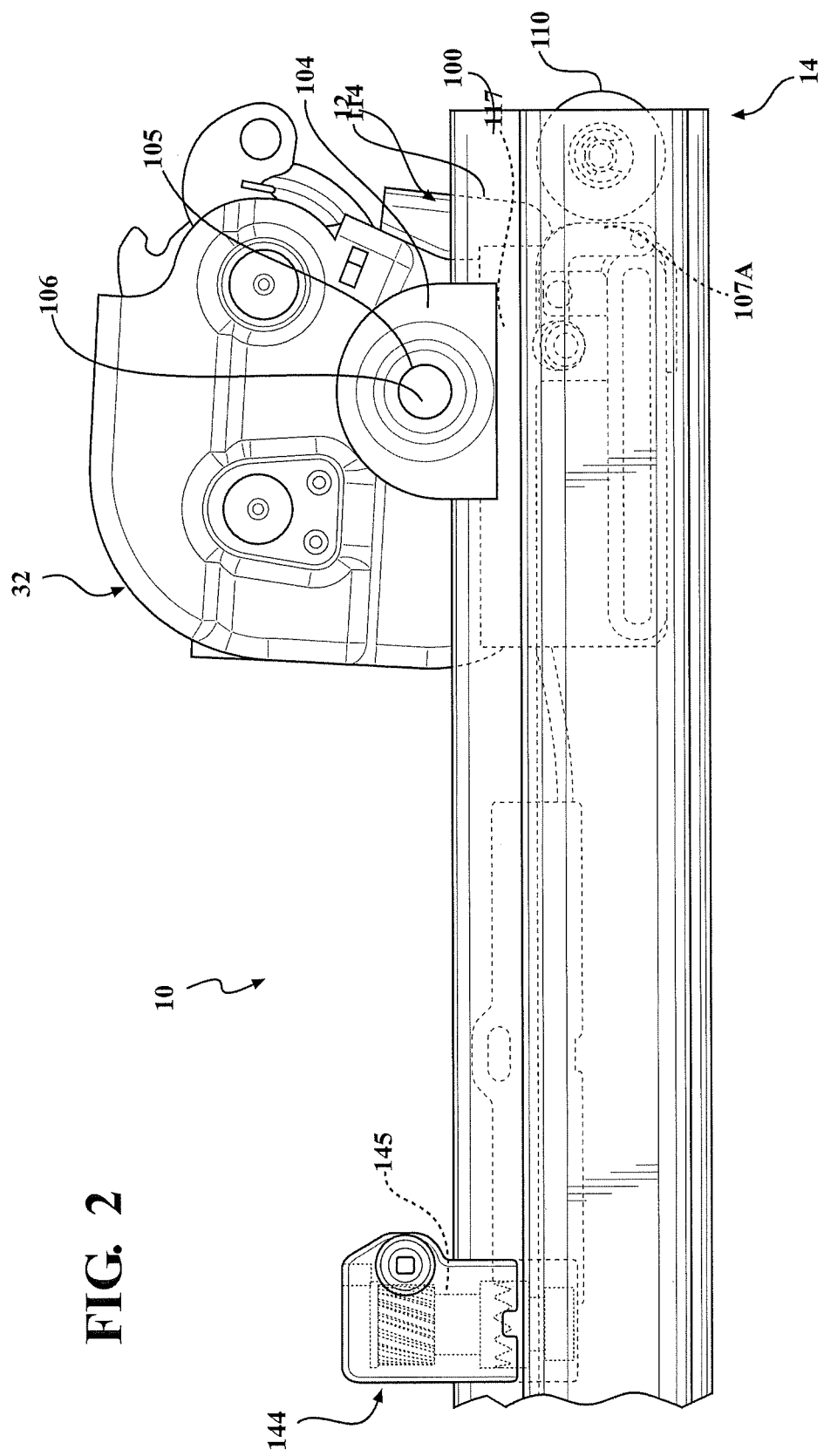
FIG. 2 is a partially transparent side view of the long rail assembly.
Figure 3A:
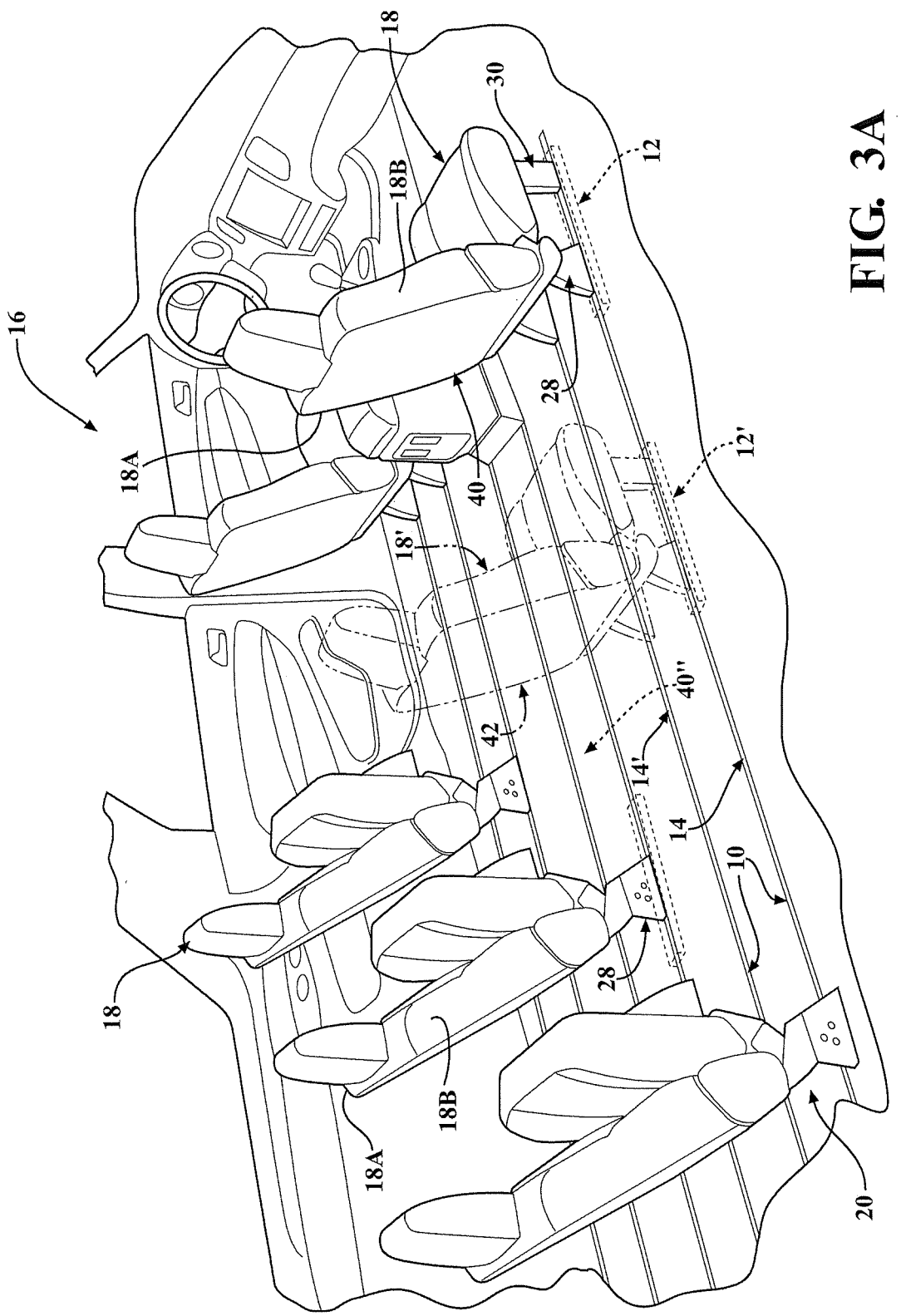
FIG. 3A is a fragmentary perspective view of a vehicle interior having vehicle seats coupled to the long rail assembly according to one embodiment of the present invention.
Figure 4:
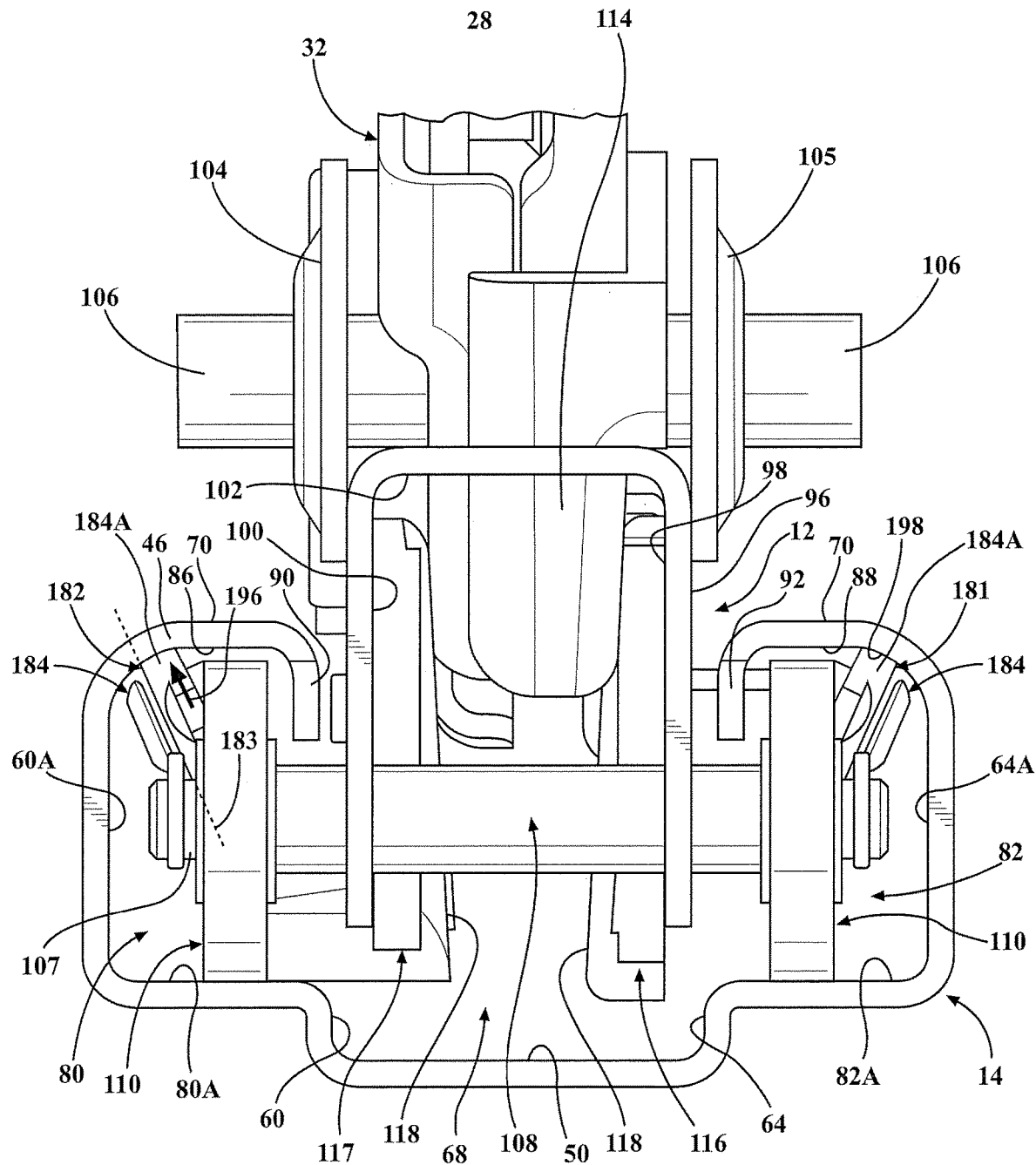
FIG. 4 is an end view of the long rail assembly.
Figure 5:
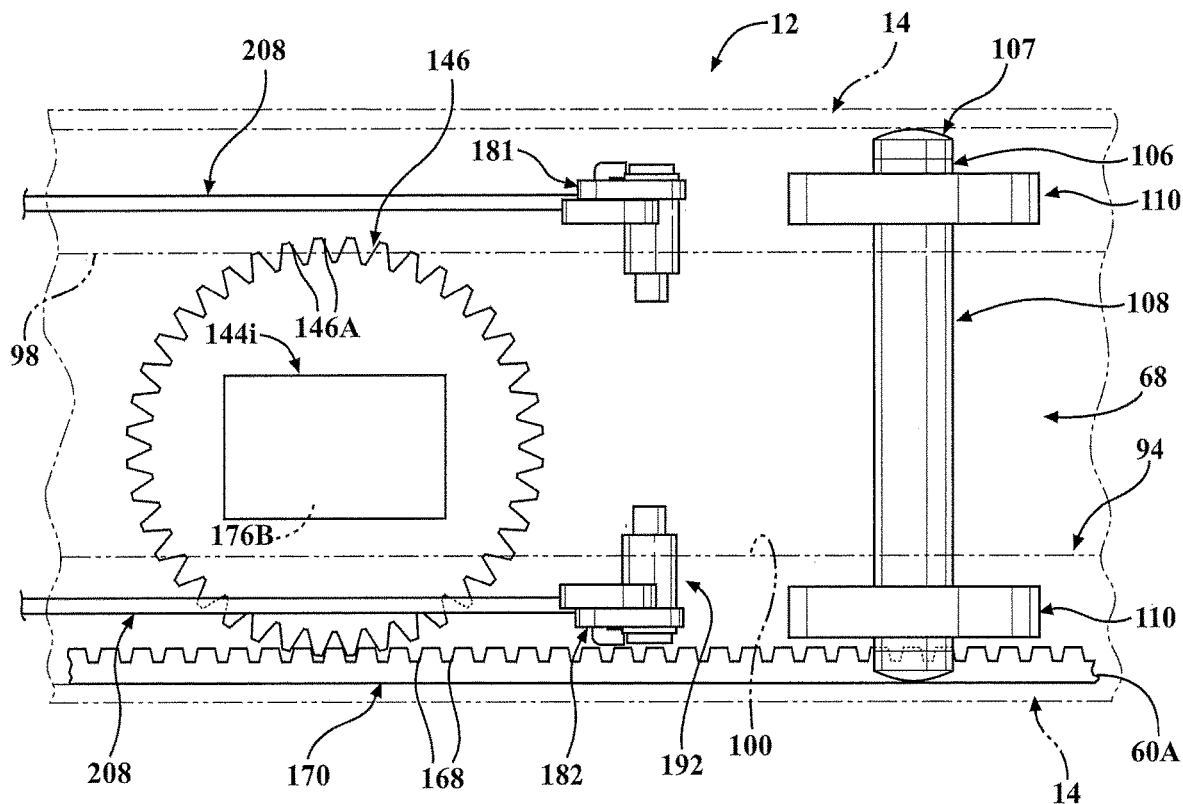
FIG. 5 is a cutaway top view of a portion of the long rail assembly of FIG. 1.
Figure 6:
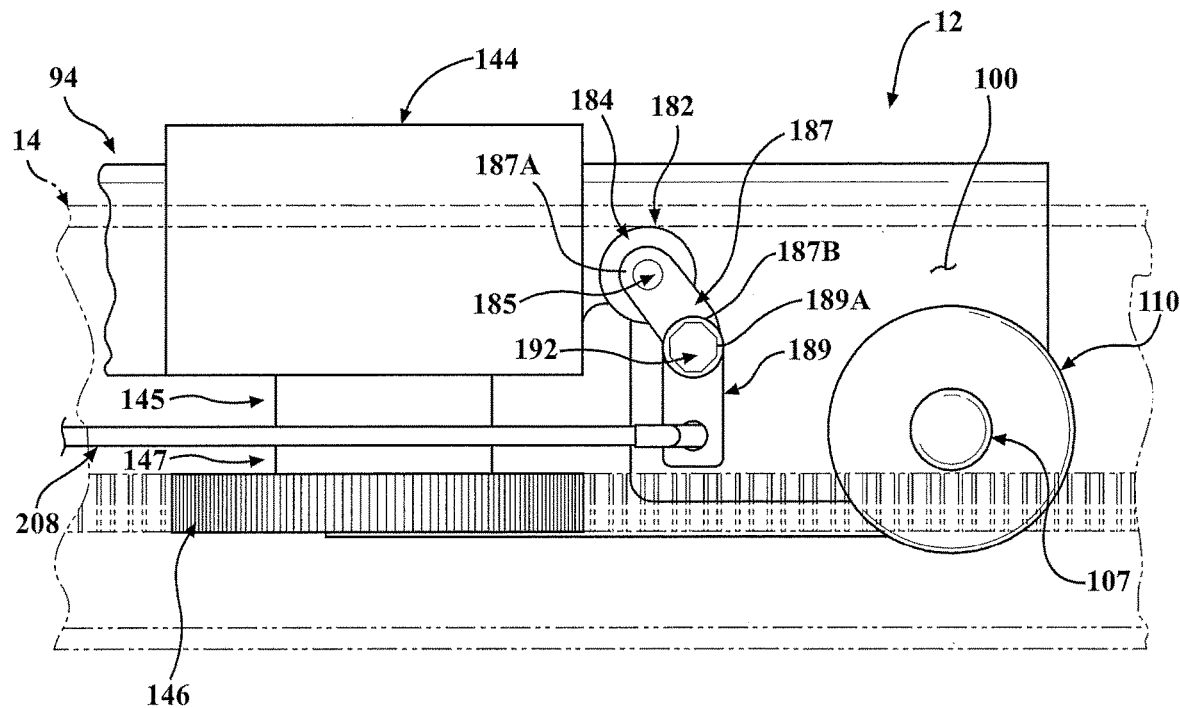
FIG. 6 is a cutaway side view of the portion of the long rail assembly of FIG. 1.

FIGS. 1 and 2 illustrate a long rail assembly 10 having a power rail drive assembly 12 for adjusting the position of a vehicle seat along a long rail 14 according to one embodiment of the present invention. FIG. 3A shows an interior 16 of a vehicle having a plurality of vehicle seats 18 connected to power rail drive assemblies 12 attached to a vehicle floor 20. A cross-sectional view of the long rail 14 and power rail drive assembly 12 of FIG. 1 is shown in FIG. 4. FIGS. 5 and 6 show cutaway top and side views, respectively, of the long rail 14 and the power rail drive assembly 12 of FIGS. 1 and 2, according to one embodiment of the present invention.

Figure 3B:
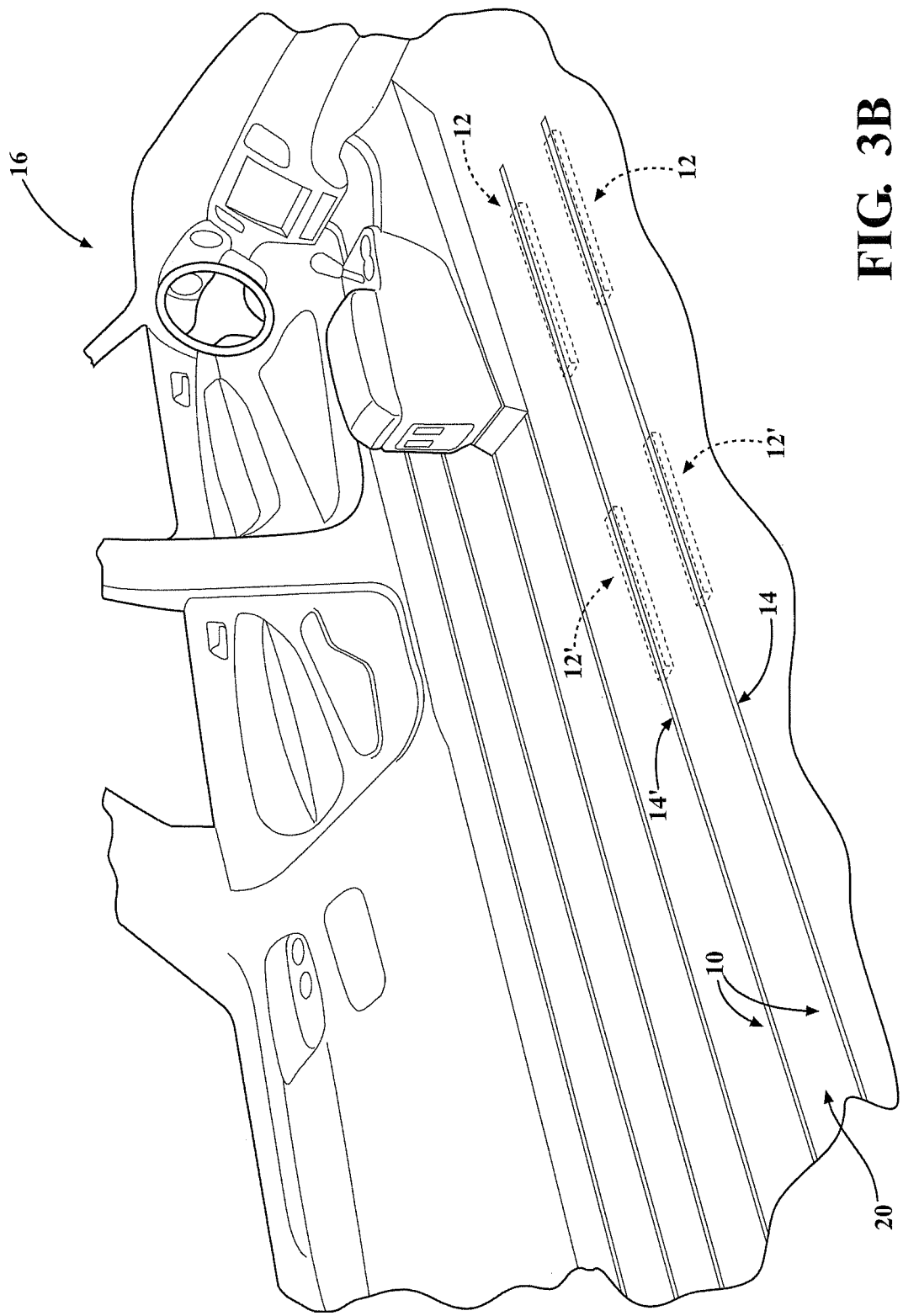
FIG. 3B is a perspective view of the vehicle interior having the vehicle seats removed from the long rail assembly.

Referring to FIGS. 3A and 3B, each vehicle seat 18 is supported by at least one leg 28 on opposing sides 18A, 18B of the vehicle seat 18, or optionally front and rear legs 30, 28 on the opposing sides 18A, 18B of the vehicle seat 18. At least one leg 28 is attached to a latch assembly 32 (See FIG. 1). The latch assembly 32 allows the seat 18 to be removably coupled to the power rail drive assembly 12. Each power rail drive assembly 12 travels along one of the fixed long rails 14 attached to the vehicle floor 20. Each vehicle seat 18 travels along a pair of long rails 14, 14' when the vehicle seat 18 is repositioned between a first seat location 40 and a second seat location 42, shown as seat 18' removably coupled to rail drive assembly 12'. The long rails 14 can extend for any length suitable for an intended application. Likewise, any suitable number of long rails 14 can be positioned on the vehicle floor 20 as desired for an intended application. Thus, the long rail assembly 10 allows for improved vehicle seat 18 position adjustment since the vehicle seat 18 coupled to at least one power rail drive assembly 12 is repositionable to any seat position 40, 42 along the at least one fixed long rail 14. Furthermore each vehicle seat 18 can be decoupled from the power rail drive assembly 12 allowing the number of seats 18 within the vehicle interior 16 to be adjusted or varied as desired.

Returning to FIGS. 1 and 2, the long rail 14 has a generally U-shaped cross-sectional profile 46 extending in a longitudinal direction, a bottom wall 50, opposing side walls 60, 64, an interior cavity 68, and a top wall 70 having an elongated opening 72 extending in a longitudinal direction. Each side wall 60, 64 of the long rail 14 includes a track 80, 82 having a generally C-shape cross-sectional profile with each track 80, 82 having a track bottom wall 80A, 82A, a track outer side wall 60A, 64A, a track top wall 86, 88, (See FIG. 4) and a retaining lip 90, 92 extending downward from the track upper wall 86, 88 and spaced apart from the track outer side wall 60A, 64A. As illustrated in FIG. 4, each track bottom wall 80A, 82A is optionally positioned above the bottom wall 50 of the long rail 14. The long rail 14 is a stamped, formed, molded, and/or rolled section of a metal or plastic material and having a length selected based on a specific application. It should be appreciated that the size and shape of the long rail 14 may vary without altering the scope of the invention.

Also shown in FIGS. 1, 2 and 4, the power rail drive assembly 12 includes a main body 94 having a generally inverted U-shape cross-section 96 in profile, opposing first and second side walls 98, 100 and a top wall 102 extending between the opposing first and second side walls 98, 100. Fixedly attached to the first and second side walls 98, 100 are a first and second striker plate 103, 104. Each striker plate is a solid piece of metal but for a central opening 105. A striker 106 passes through the central opening 105 in each of the first and second striker plates 103, 104. The striker 106 is fixedly attached to the first and second striker plates 103, 104 to allow for a sturdy connection.

The latch assembly 32 can be removably latched to the striker 106. The connection and disconnection of the latch assembly 32 with the striker 106 allows the vehicle seat 18 to be attached to or removed from the power rail drive assembly 12. Further included is an opening 112 in the top wall 102 of the power rail drive assembly 12. An extension 114 of the latch assembly 32 descends into the opening 112 of the power rail drive assembly 12 when the latch assembly 32 is being latched to the striker 106. As the extension 114 passes through the opening 112 it comes into contact with first and second wedge plates 116, 117. The wedge plates 116,117 are each attached to their respective first and second side wall 98, 100 of the power rail drive assembly 12. Each wedge plate 116,117 has an angled or tapered surface 118 which means the space between the first and second wedge plate 116,117 decreases as the extension 114 of the latch assembly 32 descends through the opening 112 in the in the top wall 102 of the power rail drive assembly 12. The angled surfaces 118 help guide and center the latch assembly 32 into position through contact with the extension 114. The angled surfaces 118 also create a snug and secure fit with the extension 114 once the latch assembly 32 is fully latched to the striker 106.

In order to allow for smooth movement of the seat when latched, an axle 107 extends laterally through a hollow tube 108 extending between the opposing side walls 98, 100. A wheel 110 is fixedly coupled to each end 107A of the axle 107. While not shown, the wheels 110 can be replaced by rollers and/or glides. Any number and/or combination of wheels 110, rollers, and/or glides may be used as suitable for an intended application. Further, each wheel 110 or roller can be rotationally attached to the main body 94 using a shaft (not shown) fixedly coupled to one of the side walls 98, 100 of the main body 94.

As also shown in FIGS. 1 and 2, the power rail drive assembly 12 includes a gearbox 144 which includes a driving gear 145. The driving gear 145 is operatively coupled to a lateral driving wheel 146 through a coupling interface 147. The gearbox 144 is located within the vehicle seat 18, while the lateral driving wheel 146 is located within the long rail 14. The coupling interface 147 is located between the driving gear 145 of the gearbox 144 and the lateral driving wheel 146 such that the gearbox 144 operatively engages with the lateral drive wheel 146 when the vehicle seat 18 is coupled to the power rail drive assembly 12 as will be described in more detail below.

Referring to FIGS. 5 and 6, the lateral driving wheel 146 is a plastic gear 146 having a plurality of gear teeth 146A. The gear teeth 146A of the lateral driving wheel 146 meshingly engage with gear teeth 168 and/or notches 168 in a rack gear 170 fixedly coupled to the side wall 60A of the long rail 14. The lateral driving wheel 146 is not a load-carrying component. While the lateral driving wheel 146 can comprise other materials as desired for an intended application, the plastic gear 146 provides a quiet driving method as the power rail drive assembly 12 travels along the long rail 14. Further, the gear teeth 168 on the rack gear 170 prevent driving slip when the gear teeth 168 meshingly engage with the gear teeth 146A on the lateral driving wheel 146.

Referring to FIGS. 4-6, a pair of stability rolling elements 181,182, are shown rotationally coupled to each side wall 98, 100 of the power rail drive assembly 12. Each pair of stability rolling elements 181, 182 are also coupled together through a tension spring 208. FIG. 5 illustrates a cut-away perspective view of the rail drive assembly 12 and the long rail 14 of FIG. 1 showing the stability rolling elements 181, 182 mounted to the side walls 98, 100 of the long rail 14. FIG. 6 shows a side view of the main body 94 of the rail drive assembly 12, the wheels 110, and stability rolling elements 181, 182. FIG. 4 is a cross-sectional end view taken of FIG. 6 showing the stability rolling elements 181, 182 being mounted at an angle 183 to the side walls 98, 100 of the main body 94. While the stability rolling elements 181, 182 can be mounted at any suitable angle 183 to the side walls 98, 100 of the main body 94, in the embodiment shown in FIG. 4 the stability rolling elements 181, 182 are mounted at about a 30 degree angle 183 to the respective side wall 98, 100.

Each stability rolling element 181, 182 includes a roller 184, an upper arm 187, a lower arm 189, and a support stud 192. Referring to FIG. 6, the roller 184 is rotationally coupled to pivot 185 near one end 187A of the upper arm 187. A second end 187B of the upper arm 187 is rotationally coupled to the support stud 192. The support stud 192 is fixedly coupled to an adjacent side wall 98, 100 at a mounting angle 183, such as about 30 degrees as shown in FIG. 4. Alternatively, the support stud 192 can extend generally perpendicular from the side wall 98, 100 of the main body 94 as illustrated in FIG. 5. Thus, the support stud 192, upper arms 187, and lower arms 189 can be orientated at any suitable angle with respect to the side walls 98, 100 of the main body 94 suitable for a specific application without altering the scope of the invention.

Also shown in FIG. 6, an upper end 189A of the lower arm 189 is rotationally coupled to the support stud 192. The lower end 187B of the upper arm 187 is fixedly coupled to the upper end 189A of the lower arm 189 so they are linked together to move as one arm. Alternatively, the upper arm 187 and the lower arm 189 can be replaced by a single arm if desired.

The spring-loaded rollers 184, shown in the embodiment of FIGS. 4 and 6, are mounted at an angle 183 of about 30 degrees to the adjacent side walls 100, 98 of the main body 94. Further, a large corner radius 196, i.e., a curved surface, extends between the upper walls 86, 88 and the side walls 60A, 64A of the long rail 14, as shown in FIG. 4. The large corner radius 196 reduces the amount of noise caused by the roller 184 sliding along its rotational axis. It should be appreciated that the angular relationship between the roller 184 and the attached upper arm 187 with respect to the adjacent side walls 100, 98 of the main body 94, as well as the corner radius 196, can vary without altering the scope of the invention. In the embodiment shown in FIG. 4, the angle 183 and the radius 196 are selected such that a rolling surface 184A of the roller 184 generally frictionally engages with a curved portion 198 extending between the side walls 60A, 64A and the upper walls 86, 88 of the long rail 14. The roller 184 absorbs long rail 14 variations in both a lateral and a vertical direction since the roller 184 is angled at about 30 degrees from the side walls 100, 98 of the main body 94.

Further description of the sliding movement between drive rail assembly 12 and fixed long rail 14 is fully set forth in Applicant's co-pending application no. PCT/US2019/055835, entitled Long Rail Assembly for Vehicle Seat Adjustment, filed Oct. 11, 2019, the disclosure of which is hereby incorporated by reference in its entirety.

Figure 7:
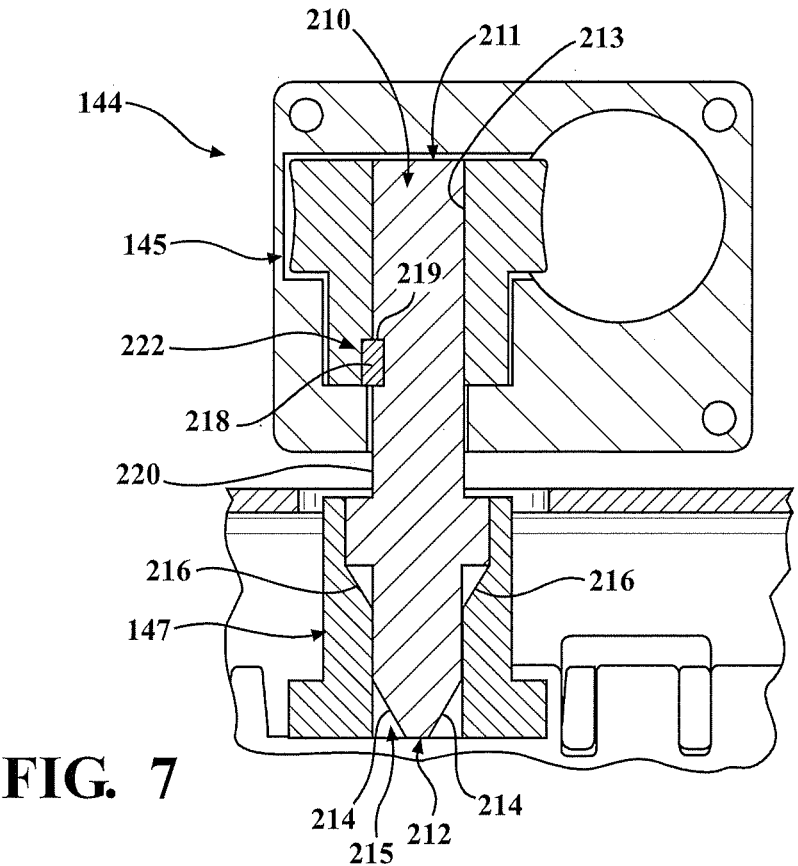
FIG. 7 is a cross-sectional side view of a guide pin with a key feature and a gear box of the long rail assembly.

Referring to FIGS. 1, 2 and 7, the gearbox 144 of the long rail assembly 10 provides the force needed for rotation of the lateral driving wheel 146. The force is transferred from the driving gear 145 of the gearbox 144 to the lateral driving wheel 146 through the coupling interface 147. The structure of the coupling interface 147 may vary between different embodiments of the long rail assembly 10.

Figure 8:
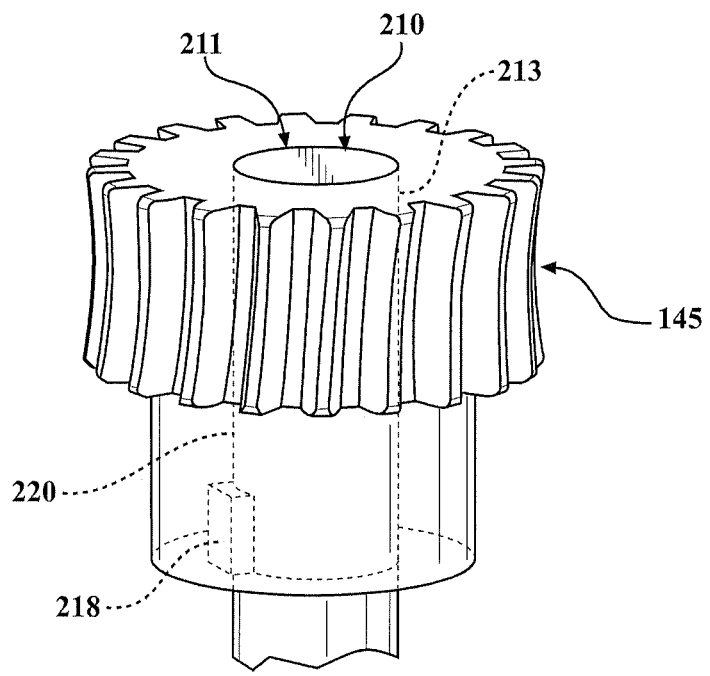
FIG. 8 is a partially transparent perspective view of the guide pin of the long rail assembly with the key feature.

Referring to FIGS. 7 and 8, the gearbox 144 within the vehicle seat 18 includes a guide pin feature 210. The guide pin 210 helps center the gearbox 144 with the driving wheel 146 when the seat 18 is being coupled and latched to the power rail drive assembly 12. The guide pin 210 extends from a proximal end 211 received in a central bore 213 of the driving gear 145 to an opposite distal head 212. The head 212 includes narrowing angled sidewalls 214. The angled sidewalls 214 are guided by angled sidewalls 216 formed by a central bore 215 in the driving wheel 146, which forms part of the coupling interface 147, as the guide pin 210 is inserted into the coupling interface 147. The interaction between the angled sidewalls 214 of the guide pin 210 and the angled side walls 216 of the coupling interface 147 helps guide the gearbox 144 into position during assembly. In some embodiments the guide pin 210 further includes a key feature 218. The key feature 218 may include a slight protrusion extending radially from the outer surface 220 of the guide pin 210 or may be a separate key tab seated within a slot 219 formed in the outer surface 220 of the guide pin 210. The key feature 218 aligns with a slot 222 formed within the driving gear 145. The slot 222 is slightly larger than the key feature 218 which helps with self-alignment of the coupling interface 147 by allowing for a small amount of rotation between the guide pin 210 and the driving gear 145.

Figure 9:
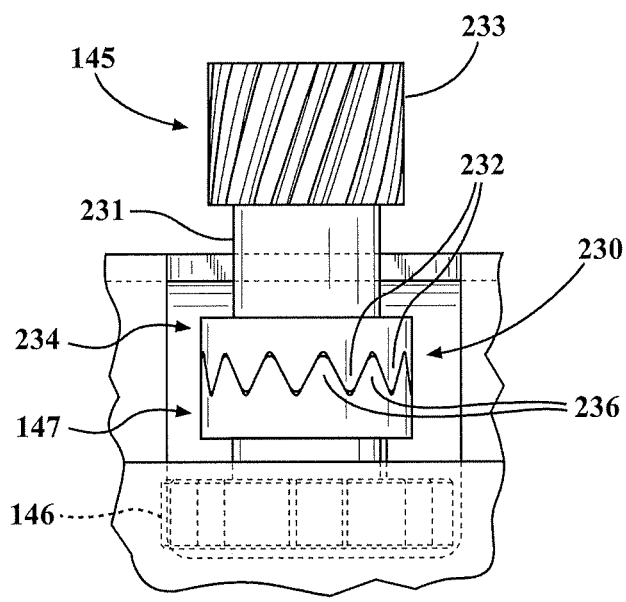
FIG. 9 is a side view of the long rail assembly with a face spline joint coupling interface.
Figure 10:
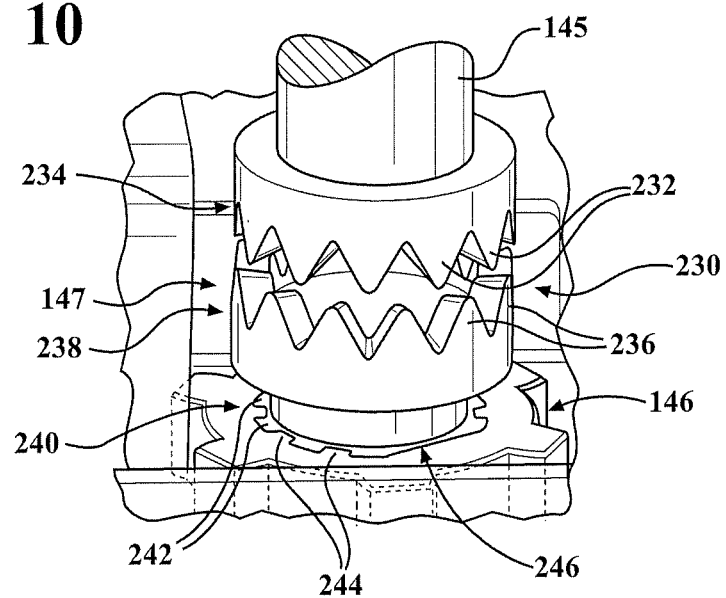
FIG. 10 is a fragmentary perspective side view of the long rail assembly with the face spline joint coupling interface.

Referring to FIGS. 9 and 10, one embodiment of the coupling interface 147 between the driving gear 145 and the lateral driving wheel 146 is shown with a face spline joint 230. In this embodiment, the driving gear 145 includes shaft 231 extending axially from the gear teeth 233 to a set of axial facing teeth 232 formed at a distal first end 234. The teeth 232 of the driving gear 145 mesh with an opposing axial facing first set of teeth 236 formed at a mating first end 238 of the coupling interface 147. The coupling interface 147 includes a second end 240, opposite the first end 238, defined by a radial second set of teeth 242. The second set of teeth 242 of the coupling interface 147 mesh with a radial set of teeth 244 formed in a central opening 246 of the lateral drive wheel 146 (See FIG. 10). Therefore, the coupling interface 147 provides a meshed connection between the driving gear 145 and the drive wheel 146 to transfer rotation of the driving gear 145 to the drive wheel 146 to provide power sliding movement of the power rail drive assembly 12 along the fixed long rail 14 while also allowing removable coupling of the seat to the power rail drive assembly 12.

Figure 11:
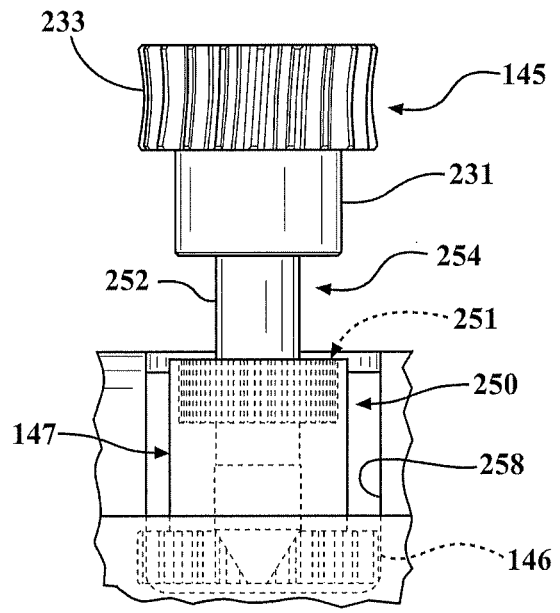
FIG. 11 is a side view of the long rail assembly with a shaft spline joint coupling interface.
Figure 12:
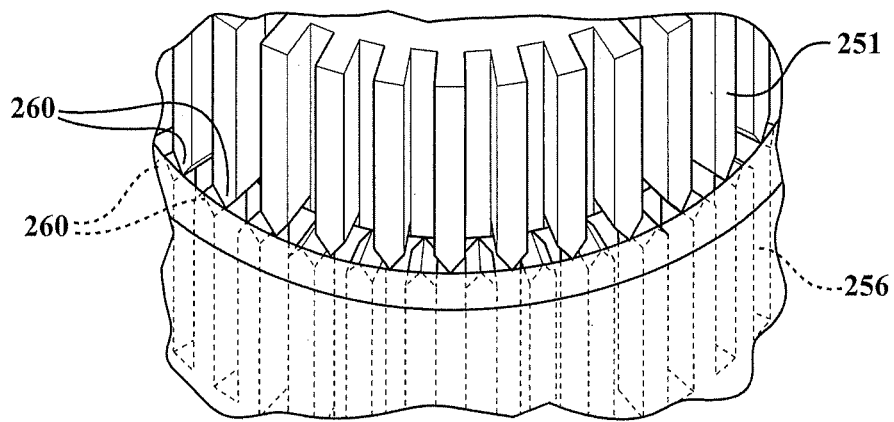
FIG. 12 is a partially transparent perspective side view of the shaft spline joint of the long rail assembly with tapered splines.

Referring to FIGS. 11 and 12, in another embodiment the coupling interface 147 between the driving gear 145 and the lateral driving wheel 146 may be a shaft spline joint 250. In this embodiment, the driving gear 145 includes a radial set of splines 251 that extend from an external surface 252 of a body portion 254 of the shaft 231. The splines 251 of the driving gear 145 mesh with a corresponding radial set of splines 256 on an internal surface 258 of the coupling interface 147. The teeth 242 on the second end 240 of the coupling interface 147 mesh with the teeth 244 in the central opening 246 of the lateral driving wheel 146 (See FIG. 10). In the depicted embodiment, the shaft spline joint 250 includes splines 251, 256 which have corresponding and axial facing tapered ends 260 (See FIG. 12). The tapered ends 260 allow for self-alignment between the splines 251 and splines 256 thereby removably coupling the driving gear 145 and the lateral driving wheel 146.

One benefit of a long rail assembly having a power rail drive assembly is the power rail drive assembly can automatically transpose an attached vehicle seat along a fixed rail. Additionally the long rail power rail drive assembly allows the seats to be removed and added to the assembly as desired by the consumer.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A long rail assembly for providing sliding movement of a seat within a vehicle, the long rail assembly comprising:
   a fixed long rail extending longitudinally between opposing first and second ends and defining an interior cavity therebetween;
   a rail drive assembly extending longitudinally between opposing first and second ends and slidably coupled to said fixed long rail for providing said sliding movement of the seat along the fixed long rail;
   a drive wheel rotatably coupled within said interior cavity of said fixed long rail;
   a gearbox including a driving gear and adapted to be attached to the vehicle seat and operatively coupled to said drive wheel for automatically driving said rail drive assembly longitudinally along said fixed long rail;
   a coupling interface between said gearbox and said drive wheel for removably coupling said gearbox to said drive wheel and provide power sliding movement of said rail drive assembly along said fixed long rail while also allowing removable coupling of the seat to said rail drive assembly, and wherein said driving gear of said gearbox is operatively coupled to said drive wheel through said coupling interface; and a latch assembly attached to the vehicle seat and removably latched to a striker of said rail drive assembly to removably ltch the vehicle seat to said rail drive assembly of said long rail assembly.

2. The long rail assembly as set forth in claim 1, wherein said latch assembly is fixedly attached to a leg of the vehicle seat.

3. The long rail assembly as set forth in claim 1, wherein said rail drive assembly includes an elongated main body defined by spaced apart opposing first and second side walls interconnected by a third wall extending therebetween.

4. The long rail assembly as set forth in claim 3, wherein said striker is attached to a first and second striker plate, said first and second striker plates are fixedly attached to said opposing first and second side walls of said rail drive assembly.

5. The long rail assembly as set forth in claim 4, wherein said latch assembly has an extension, said extension is inserted into an opening in said third wall of said rail drive assembly when said latch assembly is being latched to said striker.

6. The long rail assembly as set forth in claim 5, wherein said extension of said latch assembly comes into contact with a first and second wedge plate as said extension descends through said opening of said rail drive assembly.

7. The long rail assembly as set forth in claim 6, wherein said first and second wedge plates are fixedly attached to an inner surface of said opposing first and second side walls of said rail drive assembly.

8. The long rail assembly as set forth in claim 7, wherein said first and second wedge plates each have an angled surface, said angled surfaces cause the space between the first and second wedge plate to decrease as said extension of said latch assembly descends through the opening in a top wall of said rail drive assembly.

9. The long rail assembly as set forth in claim 8, wherein a guide pin is included, said guide pin extends from said gearbox, said guide pin helps to center said gearbox with said coupling interface during attachment of the vehicle seat to said rail drive assembly.

10. The long rail assembly as set forth in claim 9, wherein said guide pin extends from a proximal end received in a central bore of said driving gear to an opposite distal head.

11. The long rail assembly as set forth in claim 10, wherein said distal head of said guide pin includes narrow angled sidewalls, said narrow angled side walls are guided by angled sidewalls formed by a central bore within said drive wheel, said central bore forming said coupling interface and guiding said gearbox as said guide pin is inserted into said coupling interface.

12. The long rail assembly as set forth in claim 11, wherein said guide pin includes a key feature.

13. The long rail assembly as set forth in claim 12, wherein said key feature is a slight protrusion extending radially from an outer surface of said guide pin.

14. The long rail assembly as set forth in claim 12, wherein said key feature is a separate key tab seated within a slot formed in an outer surface of said guide pin.

15. The long rail assembly as set forth in claim 12, wherein said key feature aligns with a slot within said driving gear, said slot is slightly larger than said key feature which helps with self-alignment by allowing for a small amount of rotation between said guide pin and said coupling interface.

16. The long rail assembly as set forth in claim 15, wherein said coupling interface has a second end with a second set of teeth, said second set of teeth mesh with a set of teeth in a central opening of said drive wheel.

17. The long rail assembly as set forth in claim 16, wherein said coupling interface is a face spline joint, said coupling interface has a first set of teeth at a first end which mesh with a set of teeth at a first end of said driving gear.

18. The long rail assembly as set forth in claim 16, wherein said coupling interface is a shaft spline joint, said coupling interface has a set of splines extending form an internal surface, said splines of said coupling interface mesh with a set of splines on an external surface of said driving gear.

19. The long rail assembly as set forth in claim 18, wherein the splines of the said coupling interface and the splines of said drive wheel have tapered ends, said tapered ends allow for self-alignment between said driving gear and the drive wheel.

20. A long rail assembly for providing sliding movement of a seat within a vehicle, the long rail assembly comprising:

a fixed long rail extending longitudinally between opposing first and second ends and defining an interior cavity therebetween;

a rail drive assembly extending lontiduinally between opposing firstand second ends and slidably coupled to said fixed long rail for providing said sliding movement of the seat along the fixed long rail;

a drive wheel rotatably coupled within said interior cavity of said fixed long rail;

a gearbox adapted to be attached to the vehicle seat and operatively coupled to said drive wheel for rotating said drive wheel and automatically driving said rail drive assembly longitudinally along said fixed long rail; and a coupling interface between said gearbox and said drive wheel for removably coupling said gearbox to said drive wheel for transmitting rotation therebetween and provide power sliding movement of said rail drive assembly along said fixed long rail while also allowing removable coupling of the seat to said rail drive assembly.

21. The long rail assembly of claim 20, wherein said gearbox includes a driving gear and said driving gear of said gearbox is operatively coupled to said drive wheel through said coupling interface.

22. The long rail assembly of claim 20, wherein a latch assembly is included, said latch assembly is attached to the vehicle seat and removably latches the vehicle seat to said rail drive assembly of said long rail assembly.

23. The long rail assembly as set forth in claim 22, wherein said latch assembly is removably latched to a striker of the rail drive assembly.

* * * * *